(12) United States Patent
Brownworth et al.

(10) Patent No.: US 8,675,476 B2
(45) Date of Patent: Mar. 18, 2014

(54) MULTI-STREAMING COMMUNICATION SESSION

(71) Applicant: Bandwidth.com, Inc., Raleigh, NC (US)

(72) Inventors: L. Anders Brownworth, Cambridge, MA (US); Jared Kashimba, Micanopy, FL (US); Timothy Jones, Cary, NC (US); Sai Rathnam, Raleigh, NC (US)

(73) Assignee: Bandwidth.com, Inc., Raleigh, NC (US)

( * ) Notice: Subject to any disclaimer, the term of this patent is extended or adjusted under 35 U.S.C. 154(b) by 0 days.

(21) Appl. No.: 13/943,123

(22) Filed: Jul. 16, 2013

(65) Prior Publication Data

US 2013/0301613 A1   Nov. 14, 2013

Related U.S. Application Data

(63) Continuation of application No. 13/693,572, filed on Dec. 4, 2012.

(60) Provisional application No. 61/577,579, filed on Dec. 19, 2011.

(51) Int. Cl.
*G06F 11/00* (2006.01)

(52) U.S. Cl.
USPC .......... 370/218; 370/243; 370/244; 370/245; 370/248; 370/252; 370/401; 370/474

(58) Field of Classification Search
USPC ......... 370/227, 228, 315, 366, 401, 537, 538, 370/540
See application file for complete search history.

(56) References Cited

U.S. PATENT DOCUMENTS

| 7,085,268 B2 * | 8/2006 | Fukuda et al. | 370/389 |
| 2003/0229839 A1 * | 12/2003 | Wang et al. | 714/776 |

* cited by examiner

*Primary Examiner* — Alvin Zhu
(74) *Attorney, Agent, or Firm* — Gregory Stephens

(57) ABSTRACT

A communication session between a first communication device and a second communication device is hosted in an Internet Protocol (IP) based packet data network. A contact server functions as a bridge service between the first communication device and the second communication device. A communication link between the first communication device and the contact server or the second communication device and the contact server is initially a voice-over IP (VoIP) communication link over a wireless data network comprised of a first packet data media stream. The contact server receives the first packet data media stream and at least one other packet data media stream from the first communication device and combines them into a single packet data media stream before transmitting the combined single packet data media stream to the second communication device.

16 Claims, 4 Drawing Sheets

MULTI-STREAMING COMMUNICATION SESSION

RELATED APPLICATIONS

This application claims priority to U.S. patent application Ser. No. 13/693,572 entitled "Intelligent Multi-Streaming for Enhancing or Avoiding Dropped and Interrupted Communication Sessions", which was filed on Dec. 4, 2012 which claims priority to U.S. Provisional Patent Application No. 61/577,579 entitled "Intelligent Handoff Between Networks", which was filed on Dec. 19, 2011, both of which are incorporated herein by reference in their entirety.

BACKGROUND

Communication devices, such as smart phones, tablet computers, etc., may be equipped with cellular transceivers to enable communication via a cellular network. Additionally or alternatively, such communication devices may be equipped with other hardware and/or software components for enabling communication via other types of networks, including data networks such as, for example, the Internet, an intranet, a wide area network, a local area network, etc. Communication devices capable of communicating via multiple types of networks may be provided with functionality for handing-off a communication session from one network to another network, including a network of a different type, in order to avoid dropping the communication session. What is needed, however, is functionality for more intelligently managing such handoffs and otherwise enhancing communication sessions or avoiding dropped or interrupted communication sessions.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
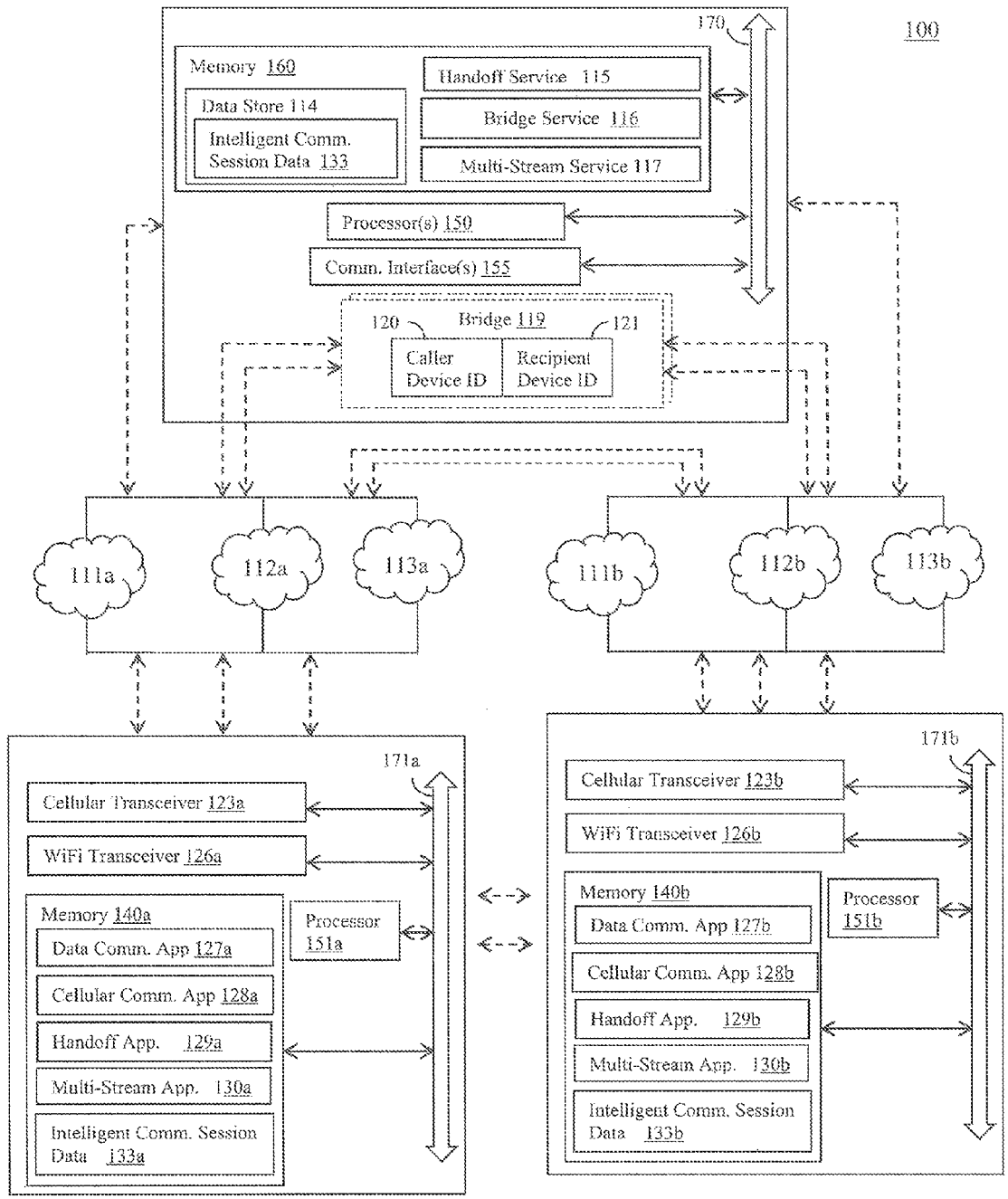
FIG. 1 depicts an exemplary networked environment for implementing certain exemplary embodiments of the present invention.

The present invention provides systems and methods for intelligently enhancing communication sessions or avoiding dropped or interrupted communication sessions between or among communication devices. For example, a dropped or interrupted communication session may be avoided by handing-off the communication session from one network to another. As another example, multiple media streams from one communication device to another communication device may be aggregated, switched, mixed or otherwise combined in order to enhance the overall quality of a communication session and/or avoid the communication session being dropped or interrupted. The systems and methods of the invention may be embodied in and performed by communication devices, contact servers and other devices, and software instructions executed by some or all of such devices, as will be explained in detail below. The different types of networks contemplated herein include, for example, cellular networks, the public switched telephone network (PSTN), and data networks, such as the Internet or other IP-based networks, including wide area networks, local area networks, etc.

As used herein the term "communications session" is meant to generally indicate any one-way or two-way exchange of information between two communication devices. Communication sessions may include voice communication sessions, multimedia communication sessions, or any other type of data communication sessions or messaging exchanges. As used herein, the term "communication link" is intended to mean a physical or logical channel that connects two or more devices. A communication link may be a signaling link or a media link. In this context, a communication session may be established via one or more communication links. One or more media streams may be transmitted over a communication link.

Given the convergence of and interoperation among different types of network technologies, which blurs the line between various distinct networks, this disclosure focuses on access networks. An access network is the portion of a communications network that connects subscriber devices to a service provider's core network. Therefore, references herein to a communication device capable of connecting to or communicating via a cellular network refers to a communication device equipped with a cellular transceiver for communication with base stations and other cellular network access points. Similarly, references herein to a communication device capable of connecting to or communicating via a data network refers to a communication device equipped with a transceiver or other network interface for communication with a router or other data network access point.

In accordance with certain embodiments, a communication device communicating with a first network may execute a "handoff application," which causes the communication device to identify and connect to another network and to cause the communication session to be handed-off from the first network to the second with minimal or no service interruption. The handoff application may rely on intelligent communication session data in order to make intelligent determinations about whether and when a handoff is to occur. "Intelligent communication session data" is intended herein to mean any data relating to a communication session or its constituent communication link(s), such as detected signal strengths, available networks, protocol and buffer statistics and analysis, environmental and/or geographical factors, the performance of access points and other network components, past interactions between or among communication devices, access points and other network components, context of conversations during voice calls, and other data points described herein. The handoff application or other functionality executed by the communication device may create, record and/or monitor intelligent communication session data. The handoff application additionally or alternatively may receive intelligent communication session data from other communication devices and/or other network devices. In some embodiments, the handoff application additionally or alternatively receives intelligent communication session data and/or handoff instructions from a "handoff service," which may be executed on a contact server or, in some embodiments, may be executed by the communication device or any other network device(s).

A communication device may execute a "multi-stream application," which may configure or control the device to concurrently communicate with two or more networks, thereby transmitting and/or receiving multiple media streams of the same or related content. The multiple media streams may be aggregated, switched, mixed or otherwise combined to enhance the overall quality of a communication session. The multi-stream application may rely on intelligent communication session data in order to make intelligent determinations about whether and when multi-streaming is to occur. The multi-stream application or other functionality executed by the communication device may create, record and/or monitor intelligent communication session data. The multi-stream application additionally or alternatively may receive intelligent communication session data from other communication devices and/or other network devices. In some embodiments, the multi-stream application additionally or alternatively receives intelligent communication session data and/or multi-streaming instructions from a "multi-stream service," which may be executed on a contact server or, in some embodiments, may be executed by the communication device or any other network device(s).

A contact server may be employed to manage communication sessions between or among multiple communication devices. For example, in some embodiments, when a first communication device (e.g., a caller device) is operated to establish a communication session with a second communication device (e.g., a recipient device), a first communication link may be established between the caller device and the contact sever and a second communication link may be established between the contact server and the recipient device. Various methods for establishing a communication link between the contact server and a communication device are known in the art and will of course depend on the type of access network used by the communication device. With the first and second communication links established, the contact server may then bridge the two communication links to establish the communication session between the communication devices. In other embodiments, the contact server may not physically bridge or relay media streams between communication devices, but may provide means of contact and/or facilitate signaling to set-up, manage and tear-down communication sessions between or among communication devices.

The contact server may execute a "handoff service" and/or a "multi-stream service," each of which may generate intelligent communication session data based on characteristics of or factors relating to the communication session and/or prior communication sessions between the caller device and the recipient device, as well as communications sessions between and among other communications devices. Each service may also collect and/or receive intelligent communication session data from one or more of the caller device, the recipient device, other communication devices and other network devices. In some embodiments, the handoff service and/or the multi-stream service may be configured to transmit intelligent communication session data to the caller device and/or the recipient device for use by the respective device's handoff application and/or the multi-stream application in determining whether and when a communication session should be handed-off from one network to another and/or whether multi-streaming should be performed. In other embodiments, the handoff service and/or the multi-stream service may analyze the intelligent communication session data to determine when a handoff and/or multi-streaming is appropriate and may instruct one or more of the communication devices to perform a handoff or to initiate or terminate multi-streaming. As mentioned, the handoff service and/or the multi-stream service do not necessarily need to be executed by the contact server; in some embodiments one or both services may be executed on one or more other network devices (e.g., in the cloud) or may be executed locally on one or more communication devices.

FIG. 1 shows an exemplary networked environment 100 for implementing certain exemplary embodiments of the present invention. The networked environment 100 may include at least one contact server 103, a plurality of communication devices 106 and 109, and a plurality of networks 111, 112, and 113. One or more of the networks 111, 112 and 113 can be used to interconnect the contact server 103 and the communication devices 106 and 109. The exemplary networks 111, 112, and 113 include one or more cellular networks 111$a$ and 111$b$, one or more data networks 112$a$ and 112$b$, and one or more portions of the public switched telephone network (PSTN) 113$a$ and 113$b$.

In certain embodiments, cellular networks 111$a$ and 111$b$ include cellular networks or portions of cellular networks based on GSM, LTE, CDMA, and/or any other cellular network standards. Data networks 112$a$ and 112$b$ include, for example, the Internet, one or more intranets, wide area networks (WANs), local area networks (LANs), and the like, portions or all of which may be wireless and/or wired. For instance, a data network 112 may be a wireless network or a portion of a wireless network implemented using an IEEE 802.11 standard, WiMAX, and/or any other wireless data communication standard. As is known in the art, the resources the various networks 111, 112, and 113 may interface with the contact server 103 through gateway devices, routers and/or other appropriate devices (not shown). Similarly, the communication devices 106 and 109 may interface with the various networks 111, 112, and 113 through appropriate access points (not shown).

As is known in the art, a cellular network 111 provides connectivity for any communication devices capable of cellular transmission that are physically located within range of the cellular network 111. The range of a cellular network depends in part on an amplification, power, and/or energy associated with the antennas comprising cellular base station, communications devices and the like. As the communication device 106 and/or 109 moves toward the outer range of the cellular network 111, the strength of the cellular signals will become degraded. Similarly, a wireless data network 112 provides wireless connectivity to communication devices within range of a wireless access point. For instance, a wireless access point may provide connectivity using Wi-Fi standards, WiMAX standards, and/or any other type of connectivity standard. As will be appreciated by those of skill in the art, a communication device 106 and/or 109 may experience a stronger connection signal when located closer to a wireless access point than when located further away from the wireless access point. Thus, the strength of the wireless data connection may fade as the communication device 106 and/or 109 moves away from a wireless access point.

The contact server 103 may comprise, for example, a server computer or any other system having computing capability. The schematic block diagram shows that the contact server 103 may include at least one processor 150, at least one communication interface 155 (e.g., a network interface card or the like), and a memory 160, each of which is coupled to a local interface 170. The local interface 170 may comprise, for example, a data bus with an accompanying address/control bus or other bus structure as can be appreciated. Stored in the memory 160 are both data and several components (e.g., software applications) that are executable by the processor 150 and which provide the functionality of the contact server 103.

Alternatively, a plurality of contact servers 103 may be employed and may be arranged, for example, in one or more server banks or computer banks or other arrangements. For example, a plurality of contact servers 103 together may comprise a cloud computing resource, a grid computing resource, and/or any other aggregated or distributed computing arrangement. Such contact servers 103 may be located in a single installation or may be distributed among different geographical locations. For purposes of convenience, the contact server 103 is illustrated in FIG. 1 and referred to herein in the singular. Even though the contact server 103 is referred to in the singular, it is understood that a plurality of contact servers 103 may be employed in various arrangements as described above.

The contact server 103 may execute various applications and/or other functionality for, among other things, setting-up, managing and tearing-down communication sessions between communication devices 106 and 109. Also, various data is stored in a data store 114 that is stored in the memory 160 of the contact server 103 or is otherwise accessible to the contact server 103. The data store 114 illustrated in FIG. 1 may be representative of a plurality of data stores, as can be appreciated. The data stored in the data store 114, for example, may be associated with the operation of the various applications and/or functional entities of the contact server 103 as described below.

The applications and/or functional entities of the contact server 103 may include, for example, a handoff service 115, a bridge service 116, a multi-stream service 117 and other applications, services, processes, systems, engines, or functionality, including an operating system, not discussed in detail herein. The handoff service 115 may be executed to generate, collect and/or analyze intelligent communication session data 133 and to transmit intelligent communication session data 133 and/or handoff instructions to one or more communication device(s) 106 and 109. The handoff service 115 may generate intelligent communication session data 133 by monitoring and/or analyzing various aspects and qualities of communication sessions, either itself or in conjunction with the bridge service 116 or other functionality of the contact server 103. The handoff service 115 may receive intelligent communication session data 133 from communication devices 106, 109 or other network components. The handoff service 115 may also store the intelligent communication session data 133 in and retrieve it from the data store 114.

The intelligent communication session data 133 may be used by the communication devices 106 and 109 to determine whether and when a communication session (e.g., voice call, multimedia call, message exchange, etc.) will or should be handed-off between a plurality of networks 111, 112, and 113. In other embodiments, the handoff service 115 may process intelligent communication session data 133 to determine when and whether a communication session should be handed-off between a plurality of networks 111, 112, and 113 and to issue handoff commands to one or more of the communication devices 106 and 109 to trigger handoffs. Handoffs may be made between networks of the same type (e.g., a first data network to a second data network or a first cellular network to a second cellular network, etc.) or between networks of different types (e.g., a data network to a cellular network or vice versa, etc.).

The bridge service 116 may be executed to establish and manage communication sessions between or among communication devices such as, for example, a caller device 106 and a recipient device 109. The bridge service 116 may be invoked by the contact server 103 in response to receiving a request, e.g., from a caller device 106, to establish a communication session, e.g., with a recipient device. The bridge service 116 may be responsible for initiating bridges 119 to join together communication links between two or more communication devices 106, 109 and the contact server 103. In this manner, the bridge 119 serves as a media relay between the caller device 106 and the recipient device 109 and/or other communication devices.

The bridge service 116 may monitor the communication session or the bridge 119 to determine whether any of the communication devices 106, 109 become disconnected. By uniquely identifying a communication session or bridge 119 in association with the caller device 106 and the recipient device 109 (e.g., using a caller device ID 120 and a recipient device ID 121), the bridge service 116 may be able to reconnect the caller device 106 and/or the recipient device 109 to the call if either (or both) of the devices loses its connection and attempts to re-connect via the same or a different network. In some embodiments, the contact server 103 may send a notification to a communication device that dropped the call to notify it that the bridge 119 remains active or that the other communication device is otherwise still attempting to participate in the call. In some embodiments, the call can be automatically reestablished by the contact server 103 upon reaching the communication device that had lost its connection, while in other embodiments the user of the communication device may be prompted to input a command to indicate whether the call should or should not be reestablished.

In other embodiments, the contact server 103 may establish and manage communication sessions and may relay media streams between or among communication devices 106, 109 without using the bridge service 116 or bridges 119. In still other embodiments, the contact server may not physically bridge or otherwise relay media streams between or among communication devices 106, 109, but may provide means of contact and/or facilitate signaling between the communication devices 106, 109 and/or other relevant network components in order to set-up and manage communication sessions.

The multi-stream service 117 may be executed to determine when multiple media streams should be concurrently transmitted by a communication device 106, 109 that is involved in or trying to establish a communication session and/or to manage multiple concurrent media streams associated with a single communication session. The multi-stream service 117 may generate, collect and/or analyze intelligent communication session data 133 and transmit intelligent communication session data 133 and/or multi-stream instructions to one or more communication device(s) 106 and 109. The multi-stream service 117 may generate intelligent communication session data 133 by monitoring various aspects and qualities of communication sessions either itself or in conjunction with the bridge service 116 or other functionality of the contact server 103. The multi-stream service may receive intelligent communication session data 133 from communication devices 106, 109 and/or other network components. The multi-stream service 117 may also store intelligent communication session data 133 in and retrieve it from the data store 114.

The intelligent communication session data 133 may be used by the communication devices 106 and 109 to determine whether and when multiple media streams should be used in connection with a single communication session. In other embodiments, the multi-stream service 117 may process intelligent communication session data 133 to determine when multi-streaming should be invoked and to issue multi-streaming commands to one or more of the communication devices 106 and 109. Multi-streaming may involve transmitting/receiving multiple media streams over networks of the same type (e.g., a first data network and a second data network or a first cellular network and a second cellular network, etc.) or over networks of different types (e.g., a data network and a cellular network, etc.).

Multiple media streams may be aggregated, switched, mixed or otherwise combined to enhance communication quality that would otherwise be available using a single media stream. For example, portions of one media stream may be supplemented with portions of one or more other media stream(s) so as to form a more complete media stream. In other words, one media stream can be monitored to determine and identify any missing or degraded portions (i.e., data packets) and the corresponding portions of one or more other media streams, if available, can be used in replacement of the missing or degraded portions. In some applications, multi-streaming may be used where a communication device 106, 109 may not be able to establish a strong connection to any one network, but may be able to establish relatively weak(er) connections to two or more networks. For example, combining the two weak(er) media streams may form a higher quality media stream, enabling use of higher definition codec. In other applications, multi-streaming may be used as an "insurance policy"; in case one network connection is lost or significantly degrades, another network connection may be utilized instead without out the need for a handoff.

In some embodiments, multiple media streams are transmitted by one or more communications devices 106, 109 to the contact server 103, which executes the multi-stream service 117 to manage (e.g., monitor, combine) the multiple media streams. In some implementations, the contact server 103 may open multiple ports or reserve multiple IP addresses, etc. each for receiving one of the multiple incoming media streams. In other implementations, the contact server 103 may receive multiple media streams at the same port or IP address. The multi-stream service 117 may invoke the bridge service 116, which may create one or more bridge(s) 119 to join communication links and associated media streams. For example, one bridge 119 may be established to relay a first media stream from a caller device 106 to a recipient device 109 and another bridge 119 may be established to relay a second media stream from a caller device 106 to a recipient device 109. In such a case, the multi-stream service 117 may manage the communication session between the caller device 106 and the recipient device 109 so as to switch between the first and second bridges as necessary to maintain consistent or acceptable communication quality. In another example, the multi-stream application may combine or aggregate multiple incoming media streams into a single media stream before applying it to a bridge 119. Alternatively, the multi-stream service 117 and the contact server 103 may relay multiple media streams or combined media streams between and among communication devices 106, 109 without the use of the bridge service 116 or bridges 119.

The communication devices 106 and 109 illustrated in FIG. 1 are representative of a plurality of communication devices that may be communicatively coupled to one or more of the networks 111, 112 and 113. A communication device may comprise, for example, a processor-based or other computing system. For example, a communication device may be embodied in the form of a desktop computer, a laptop computer, a personal digital assistant, a cellular telephone, a set-top box, a music player, a web pad, a tablet computer, a game console, or any other device with like capabilities, including hardware and software components for establishing communication sessions via at least one of the networks 111, 112 and 113.

The schematic block diagram shows that the communication devices 106, 109 may each include at least one processor 151, one or more communication interfaces 123, 126, and a memory 140, each of which is coupled to a local interface 171. The local interface 171 may comprise, for example, a data bus with an accompanying address/control bus or other bus structure as can be appreciated.

In some embodiments, at least one of the exemplary communication devices 106 and 109 may include hardware and software components for establishing communication sessions via at least two networks, such as two different networks 111, 112 and 113, or two similar networks based on different standards (e.g., a 3G vs. 4G cellular network 112, or a 2.5 GHz WiFi vs. a 5 GHz WiFi data network 112, etc.). For example, one or both of the communication devices 106 and 109 may comprise a cellular transceiver 123 and a Wi-Fi transceiver 126. The cellular transceiver 123 may be configured to receive and transmit data over a cellular network 111. The Wi-Fi transceiver 126 may be configured to receive and transmit data over a data network 112. Additionally, the devices 106 and 109 may include components (e.g., modem or network interface unit) configured to receive and transmit data over the PSTN 113.

The communication devices 106 and 109 may further include memory 140 for storing software (e.g., operating system, applications, etc.) and data (e.g., intelligent communication session data 133, etc.). The communication devices 106 and 109 may be configured to execute various applications, such as a data communication application 127, a cellular communication application 128, a handoff application 129 and/or a multi-stream application 130. A data communication application 127 may provide functionality for enabling a Wi-Fi transceiver 126 to communicate via a data network 112 and a cellular communication application 128 may provide functionality for enabling a cellular transceiver 123 to communicate via a cellular network 111.

The handoff application 129 may be executed by the communication devices 106 and 109, for example, to determine when to handoff communication sessions from one network to another network. For example, the caller device 106 may execute a handoff application 129a that manages handoffs between a cellular network 111a and a data network 112a. The handoff application 129a may make handoff determinations based on intelligent communication session data 133a received from the handoff service 115 or other functionality executed by the contact server 103, from other network components or communication devices and/or generated locally at the caller device 106. Alternatively, the handoff application 129a may receive and respond to handoff instructions generated by the handoff service 115 executed by the contact server 103. As is known in the art, mobile devices 106 and 109 may be configured to execute many other applications as well, such as, for example, voice communication applications, email applications, instant message applications, and/or other applications.

The multi-stream application 130 may be executed by the communication devices 106 and 109, for example, to control the transmission and/or processing of multiple media streams associated with a single communication session. For example, the caller device 106 may execute a multi-stream application 130*a* that interfaces with the data communication application 127*a* and/or the cellular communication application 128*a* to control the transmission of multiple media streams via a data network 112*a* and/or a cellular network 111*a*. The multi-stream application 130*a* may determine when to invoke or discontinue transmission of multiple media streams based on intelligent communication session data 133*a* received from the multi-stream service 117 or other functionality executed by the contact server 103, from other network components or communication devices and/or generated locally at the caller device 106. Alternatively, the multi-stream application 130*a* may receive and respond to multi-stream instructions generated by the multi-stream service 117 executed by the contact server 103. Multi-stream instructions may include, for example, instructions for the initiation, termination and/or timing or sequencing of multi-stream transmissions. In the case of a recipient device, a multi-stream application 130*b* may include functionality for aggregating, switching, mixing or otherwise combining or processing multiple media streams transmitted or received in connection with a single communication session.

As described above, multiple media streams transmitted by a caller device 106 may be directed to the contact server 103 (e.g., each media stream transmitted to a different IP address or port of the contact server 103, or multiple media streams transmitted to the same IP address or port), which may aggregate, switch, mix or otherwise combine or process the multiple media streams to produce a single media stream that is relayed to the recipient device 109. In other embodiments, however, the contact server 103 may merely provide means of contact and/or facilitate signaling for the communication session, while media streams flow directly between the communication devices 106, 109 via the various networks 111, 112 and/or 113, or via peer-to-peer or proximity based communications.

In embodiments where media streams are not relayed through the contact server 103 (e.g., embodiments where communication devices 106, 109 use peer-to-peer networks for communication sessions), it may be unnecessary or undesirable to execute the handoff service 115, the bridge service 116 and/or the multi-stream service 117 at the contact server 103. Instead, one or all of these services may be executed by other network devices (e.g., in the cloud) or may be executed locally by one or more communication device(s) 106, 109. In cases where the handoff service 115, the bridge service 116 and/or the multi-stream service 117 are executed in the cloud, the communication devices 106, 109 may interact with those services to receive intelligent communication session data 133, handoff instructions, multi-streaming instructions and/or call bridging services. In cases where the handoff service 115 and/or the multi-stream service 117 are executed locally on a communication device 106, 109, those services may interact with, or may replace, the handoff application 129 and multi-stream application 130 in order to perform the intelligent handoff and multi-streaming functionality described herein. Executing the bridge service 116 locally on a communication device 106, 109 will allow that device to provide call bridging services to other communication devices.

A general description of the operation of the various components of the exemplary networked environment 100 is as follows. To begin, a user of the caller device 106 may wish to initiate a voice call and/or other communication session with another user of another communication device, such as the recipient device 109. By way of example, the caller device 106 may identify and connect to an accessible data network 112*a*, which may be an IP-based network, to initiate a communication session, which may be a voice-over-IP (VoIP) call. In some cases, the caller device 106 may be configured to interact with the resources of the data network 112*a*, which in turn interact with the contact server 103 to establish a communication link between the caller device 106 and the contact server 103. The contact server 103 then establishes a communication link with the recipient device 109.

As will be appreciated, the recipient device 109 may be connected to a cellular network 111*b*, a data network 112*b* or the PSTN 113*b*. The contact server 103 may invoke a bridge service 116 to bridge the two communication links together or may otherwise relay media between the two communication links to facilitate the communication session between the caller device 106 and the recipient device 109. Alternatively, the contact server 103 may use the two communication links as signaling paths to otherwise facilitate the communication session between the communication devices 106, 109. In still other embodiments, the caller device 106 may establish the communication session with the recipient device 109 over a peer-to-peer network or communication link without involving the contact server. Accordingly, the bridge service 116, handoff service 115 and multi-stream service 117 do not need to be executed by the contact server 103 in some embodiments and could instead be executed in the cloud or locally at the caller device 106 and/or recipient device 109. Additionally, in some exemplary environments, a contact server 103 may be used to facilitate and manage a portion of the connection link(s) while the remaining of the communication links are serviced in the cloud or locally at the communication devices 106, 109.

As described, in some embodiments the bridge service 116 may be invoked to create and manage a bridge 119 for the communication session. The bridge service 116 may receive or determine identifying information related to the communication session, such as a unique identifier of the caller device 106 (e.g., a caller telephone number) and a unique identifier of the recipient device 109 (e.g., a recipient telephone number). The bridge service 116 associates the communication session with it the identifying information, shown in the figure as the caller device ID 120 and the recipient device ID 121. Other unique identifiers may be used to identify the communication session in other embodiments.

In some embodiments, the bridge service 116 may monitor the communication session or bridge 119 to ensure that both the caller device 106 and the recipient device 109 remain connected to the call. As is known in the art, a communication device may lose its connection to the call due to signal degradation, a failed handoff from one network to another, and/or any of several other factors. If the bridge service 116 detects that the caller device 106 and/or the recipient device 109 loses its connection prematurely before termination of the communication session, the bridge service 116 may make or cause an attempt to reestablish a communication link with that device so as to continue the communication session.

Alternatively, a communication device (e.g., caller device 106) that prematurely loses its connection to the bridge 119 may attempt to reestablish a communication session with the other communication device (e.g., recipient device 109). In response to the new communication session request, the bridge service 116 may determine, based on the caller device ID 120 and recipient device ID 121 (or other unique identifier(s)), whether the bridge 119 is still active (e.g., the communication session has not timed-out nor been terminated by the other communication device). If so, the new link between the caller device 106 and the contact server 103 may be added to the bridge 119 so as to resume the communication session.

In some embodiments, the bridge service 116 or other related functionality may record some or all of the communication session for playback to a communication device that loses it connection and is subsequently rejoined to the communication session. In this manner, the communication device will receive at least some of the media (e.g., voice, messages, etc.) that were transmitted by the other communication device while the communication link was broken. The data rate of the recording may be increased during playback and/or the recording may be altered to remove pauses, noise, etc. in order to speed-up playback and therefore return more quickly to real-time communications.

A handoff service 115 may be executed during the communication session. The handoff service 115 may also monitor the communication session between the caller device 106 and the recipient device 109. This monitoring may be performed by the handoff service 115 itself, or in conjunction with the bridge service 116 if the bridge service 116 is also executed. The handoff service 115 may monitor certain aspects and features of the communication session, such as, available networks, detected signal strength of communication link(s), protocol and buffer statistics and analysis, including data or packet sequences received or packets dropped, network latency, jitter, delay, and other qualitative measures (e.g., based on ack/nack and other messages received from the communication devices 106, 109 and/or other network components), etc., the location(s) of the communication devices 106, 109, including environmental and/or geographical factors associated with such locations, the performance of access points and other network components, past interactions between or among communication devices, access points and other network components, the context of the conversation during a voice call, etc.

The handoff service 115 generates intelligent communication session data 133 based on the monitored aspects and features of the communication session. Depending on where the handoff service 115 is executed (e.g., on the contact server 103, in the cloud or on a communication device), the intelligent communication session data 133 may be stored in the data store 114, in the memory 140 of one or more of the communication devices 106, 109, and/or in other network component(s). In some embodiments, the handoff service 115 analyzes intelligent communication session data 133 in real time or near real time to predictively determine when a handoff of the communication session should be performed. For example, the handoff service 115 may compare current intelligent communication session data 133 to historical intelligent communication session data 133 to determine that one of the communication devices 106, 109 is approaching a location where communication sessions tend or may be likely to be dropped or interrupted or where communication quality tends to or may be likely to degrade. As another example, the handoff service 115 may determine based on intelligent communication session data 133 that one of the communication devices 106, 109 is connected to an access point that is prone to service interruptions or poor communication quality. As another example, the handoff service 115 may determine based on intelligent communication session data 133 that a handoff is desirable when one of the communication devices 106, 109 approaches or encounters an accessible location that is capable of providing a higher level of quality for the communication session, even if the quality of the existing communication session has not necessarily degraded. When the handoff service 115 determines that a handoff is necessary or may soon become necessary, it may issue a handoff instruction to the handoff application 129 executed by one or more of the communication devices 106, 109.

Similarly, the multi-stream service 117 may be executed during a communication session and may also monitor the communication session between the caller device 106 and the recipient device 109. This monitoring may be performed by the multi-stream service 117 itself, or in conjunction with the bridge service 116 or other related functionality. The multi-stream service 117 may monitor certain aspects and features of the communication session, as previously described. The multi-stream service 117 generates intelligent communication session data 133 based on the monitored aspects and features of the communication session, which may be stored in the data store 114, in the memory 140 of one or more of the communication devices 106, 109, and/or in other network component(s).

In some embodiments, the multi-stream service 117 analyzes intelligent communication session data 133 in real time or near real time to predictively determine when a communication device 106, 109 should begin to transmit or stop transmitting multiple media streams in connection with a single communication session. As in the case of intelligent handoffs, the multi-stream service 117 may determine based on intelligent communication session data 133 that multi-streaming is desirable in cases where one of the communication devices 106, 109 is approaching a location where communication sessions tend or may be likely to be dropped or interrupted or where communication quality tends to or may be likely to degrade, or where one of the communication devices 106, 109 is connected to an access point that is prone to service interruptions or poor communication quality. As another example, the multi-stream service 117 may determine based on intelligent communication session data 133 that multi-streaming is desirable when one of the communication devices 106, 109 approaches or encounters an accessible location that is capable of providing a higher level of quality for the communication session. In other words, one or more higher quality media streams may be established at least temporarily while the communication device 106, 109 is within range of such location and those media streams may be terminated when the communication 106, 109 moves out of range of such location or the quality of the primary communication link otherwise improves to an acceptable level. When the multi-stream service 117 determines that multi-streaming is necessary or may soon become necessary, it may issue a multi-streaming instruction to the multi-stream application 130 executed by one or more of the communication devices 106, 109.

The handoff service 115 and the multi-stream service 117 may be executed concurrently or may be used as alternatives to each other. When used concurrently, additional functionality or logic is required to determine whether a handoff or multi-streaming should be invoked where both are available options for enhancing communication sessions and/or avoiding a dropped or interrupted communication session. For instance, priorities may be set within the logic of the handoff service 115, the multi-stream service 117 or other related functionality such that in certain cases multi-streaming takes precedence over handoff or vice versa. As but one example, where it is desirable to maximize usage of a data network 112 (e.g., due to lower cost), it may be preferable to temporarily supplement a media stream transmitted via the data network 112 using a concurrent media stream transmitted via a cellular network 111, rather handing-off the communication session from the data network 112 to the cellular network 111 and subsequently handing-off the communication session from the cellular network 111 back to the data network 112.

In some embodiments, the handoff application 129*a* executed by the caller device 106 may not passively await handoff instructions from the handoff service 115 (e.g., where the handoff service 115 is executed by the contact server 103 or in the cloud), but may additionally or alternatively monitor the communication link(s) of the communication session to detect and assess any degradation in connectivity. For example, the handoff application 129*a* may monitor the strength of the connection signal received by the Wi-Fi transceiver 126*a* or the cellular transceiver 128*a* during the communication session. As the caller device 106 moves away from the applicable access point, the handoff application 129*a* detects a degradation in the quality of the communication link. In some embodiments, the handoff application 129*a* may determine that the signal strength of the connection signal degrades below a threshold value.

In other embodiments, the handoff application 129*a* may determine that one or more other characteristics of the communication link between the caller device 106 and a network access point degrade below a threshold value. For example, the handoff application 129*a* may determine that an amount of packet loss is below a threshold packet loss value, an amount of network latency exceeds a threshold latency value, an amount of jitter exceeds a threshold jitter value, an amount of delay exceeds a threshold delay value, etc. In such a case, the handoff application 129*a* may determine a need to handoff the communication from the data network 112*a* to another network, such as, for example the cellular network 111*a*.

Upon detecting degradation in the quality of the communication link or other factor(s) potentially necessitating a handoff, the handoff application 129*a* may trigger a handoff of the communication session to another available network. For example, the handoff application 129*a* may cause the caller device 106 to scan for available networks, such as for example, a cellular network 111*a* using the cellular transceiver 123 and/or a data network 112*a* using the Wi-Fi transceiver 126, to identify other accessible networks. The handoff application 129 may identify the other networks by scanning for connection signals being transmitted from transceivers and/or antennas, such as, for example, cellular base stations or other wireless access points. The handoff application 129*a* may then cause the caller device 106 to handoff the communication session to one of the identified networks. Those skilled in the art will appreciate that the caller device 106 may be configured to perform handoffs itself and/or may be configured to perform network-assisted handoffs or any other suitable handoff approach known in the art. The recipient device 109 may also, or alternatively, execute its own handoff application 129*b*.

Upon handing-off a communication session, the handoff application 129*a* may store information related to the handoff as intelligent communication session data 133*a*. For example, the handoff application 129*a* may store information such as the identification of the new network (e.g., a unique identifier of the access point, antenna, and/or transceiver to which the caller device 106 is connected after the handoff), a geographic location where the handoff occurred (e.g., geo-spatial coordinates), a date and time of the handoff, and/or any other information related to the handoff. In addition, the handoff application 129*a* may store information related to the communication link prior to the handoff. For example, the handoff application 129*a* may store a signal strength value and geographic location when the caller device 106 was last connected to the prior network and/or any other information related to the previous connection with the prior network.

In addition to triggering handoffs based on detected signal degradation or other characteristics of a network link, a handoff application 129 may in some embodiments trigger handoffs based on an analysis of other intelligent communication session data 133 gathered locally and/or intelligent communication session data 133 received from the contact server 103 and/or from other network components or communication devices.

In some embodiments, the handoff application 129 predicatively determines whether to initiate a handoff based on intelligent communication session data 133. For instance, the handoff application 129 may anticipate, based on the intelligent communication session data 133, that the quality of the network link might soon degrade. To determine whether to initiate a handoff, the handoff application 129 may compare intelligent communication session data 133 related to a current connection and location of the caller device 106 with historical intelligent communication session data 133. For instance, the historical intelligent communication session data 133 may indicate that a handoff occurred one or more times when the caller device 106 was previously at its current location. In response, the handoff application 129 may proactively initiate a handoff to another network, as described above, before the current connection is lost.

The handoff application 129 may invoke location based services or the like to determine the current location of the caller device 106. For example, the location based services may include a GPS chip and associated software or firmware for monitoring the location of the caller device 106 using a global positioning system. Alternatively, or in addition, the location based services may comprise software that interacts with the Wi-Fi transceiver 126*a* and/or cellular transceiver 123*a* to monitor signals generated and/or received by the caller device 106 when it communicates with other devices (e.g. wireless access points, base stations, etc.) in the applicable network. The signals may provide or may be used to provide an indication of the geographical location of the caller device 106 at a particular time, such as by triangulation or techniques like time difference of arrival (TDOA) or Enhanced Observed Time Difference (E-OTD), etc. The signals may thus permit the handoff application 129 to track the location of the caller device 106 and maintain a record of that information.

Alternatively, or in addition, devices in the wireless data network 112*a* or cellular network 111*a* may be configured to track the location of the caller device 106 and to provide the location information to the caller device 106 and/or the contact server 103 and/or another network device. For example, devices in the data network 112*a* or cellular network 111*a* may determine the location of the caller device 106 based on the delay of communication signals sent between the caller device 106 and the closest wireless access point(s), base station(s), etc. In such cases, the geographical position of the caller device 106 is determined through various techniques like triangulation, time difference of arrival (TDOA) or Enhanced Observed Time Difference (E-OTD). Those skilled in the art will appreciate that any other location based service technology may be used in accordance with the present invention. Examples of such other technologies include: Near LBS (NLBS), in which local-range technologies such as Bluetooth, WLAN, infrared and/or RFID/Near Field Communication technologies are used to determine the position of a communication device; the use of operator-independent location data provided in telecommunication signaling protocols such as SS7; and Local Positioning Systems such as Co-Pilot Beacon for CDMA networks, Bluetooth, UWB, RFID, Wi-Fi and WiMAX.

In some embodiments, the handoff application 129 may predictively determine when to initiate a handoff based on intelligent communication session data comprising audio data quality or the context of the conversation during a voice call. For instance, the handoff application 129 may scan the audio data of a voice call to detect indicia of poor audio quality (jitter, delay, noise, etc.) or to identify abnormal breaks and/or gaps in the conversation. Upon identifying an unacceptable level of audio data quality or unacceptable breaks in the conversation, the handoff application 129 may initiate a handoff process. In other embodiments, the handoff application 129 may predictively determine when to initiate a handoff for a communication session based on a video quality of a video call, and/or any other qualitative measure of a media call. In still other embodiments, the handoff application 129 may determine that a handoff should be initiated when it is determined that the caller device 106 transitions from a stationary state to a mobile state.

In some embodiments, intelligent communication session data 133 may be gathered from other communication devices 106 and 109 and other network components, i.e., "crowd-sourced". For instance, the handoff application 129 or other functionality executed on each communication device 106 and 109 may transmit intelligent communication session data 133 to the handoff service 115 or to other communication devices or other network devices. In some embodiments, the intelligent communication session data 133 may be transmitted to the handoff service 115 or to other communication devices or other network devices on a periodic basis, such as, for example, daily, weekly, monthly, and/or any other periodic basis. Alternatively, the intelligent communication session data 133 may be transmitted whenever the intelligent communication session data 133 is modified and/or gathered. In other scenarios, the handoff service 115 may poll the communication devices 106 and 109 for intelligent communication session data 133 and/or may generate intelligent communication session data 133 itself based on information received from various communication devices.

In still other embodiments, a plurality of communication devices 106, 109 may share intelligent communication session data 133 with each other via proximity-based communications (e.g., communications via WiFi, Bluetooth, Infrared (IR), Near Field Communication (NFC) or Ultra-Wide Band (UWB) signals). In addition, other network components, such as network access points, may be configured to generate intelligent communication session data 133 and to store that data and/or transmit it to a communication device 106, 109 and/or to the handoff service 115. Therefore, the handoff application 129 may use shared intelligent communication session data 133 served up by the handoff service 115 and/or other communication devices and/or other network components to predictively determine whether to initiate a handoff before the current communication session is lost.

Similarly, the multi-stream application 130a executed by the caller device 106 may not passively await multi-streaming instructions from the multi-stream service 117 (e.g., where the multi-stream service 117 is executed by the contact server 103 or in the cloud), but may additionally or alternatively monitor the communication link(s) of the communication session to detect and assess any degradation in connectivity or other characteristics of the communication link(s). The multi-stream application 130 may also analyze intelligent communication session data 133 gathered locally and/or intelligent communication session data 133 received from the multi-stream service 117 and/or from other network components or communication devices, as described with reference to the handoff application 115. Upon detecting that the connection has degraded below a predetermined threshold or that other intelligent communication session data 133 predicts an interrupted or dropped communication session (based on any or all of the examples cited with respect to the handoff application 115), the multi-stream application 130a may trigger the initiation of one or more additional media streams to be transmitted via one or more other available networks. The recipient device 109 may also, or alternatively, execute its own multi-stream application 130b.

Figure 2:
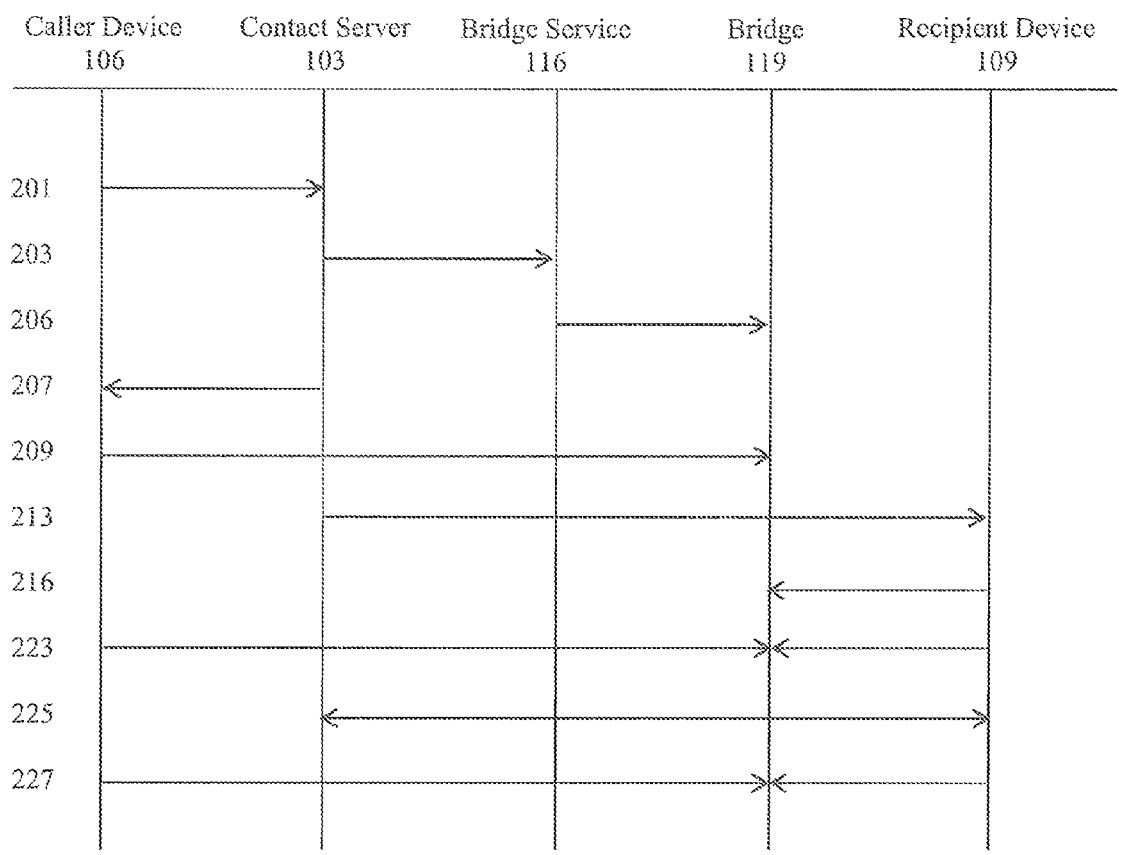
FIG. 2 is a diagram illustrating exemplary interactions between a contact server, a caller device and a recipient device according to certain exemplary embodiments of the present invention.

Referring next to FIG. 2, shown is a flowchart that provides one example of the operation of portions of the contact server 103 (FIG. 1) according to certain embodiments in which it may be used as a media relay for two or more communication devices 106, 109. In such embodiments, the contact server 103 uses a bridge service 116 to invoke and manage bridges 119 to establish and manage communication sessions between or among communication devices. It is understood that the flowchart of FIG. 2 provides merely an example of the many different types of functional arrangements that may be employed to implement operation of portions of the contact server 103 as described herein. As an alternative, the flowchart of FIG. 2 may be viewed as depicting an example of steps of a method implemented in the networked environment (FIG. 1) according to one or more embodiments.

At line 201, the caller device 106 initiates a communication session (e.g., a voice call) to a recipient device 109, via the contact server 103. In one embodiment, the contact server may receive the request over a cellular network 111a, a data network 112a, a PSTN 113a, and/or another type of network. The contact server 103 may determine the identity of the recipient device 109 from data included in the request. For instance, the data included in the request may comprise a unique phone number, user name, internet protocol (IP) address, and/or other identification associated with the recipient device 109. The contact server 103 processes the request for the communication session and invokes the bridge service 116 at line 203.

Then, at line 206, the bridge service 116 may initialize a bridge 119 on which the communication session may take place. For instance, the bridge service 116 may initialize the bridge 119 such that users on more than one communication device may connect to the bridge 119. Additionally, the bridge service 116 may associate the phone number of the caller device 106 (e.g., caller ID 120 shown in FIG. 1) and the phone number of the recipient device 109 (e.g., the recipient ID 121 shown in FIG. 1) with the bridge 119. In another embodiment, the bridge service 116 may associate another type of unique identifier with the bridge 119. Once the bridge 119 is initialized, the contact server 103 instructs the caller device 106 to connect to the bridge 119 or otherwise connects the caller device 106 to the bridge 119, as shown by line 207. The caller device 106 is connected to the bridge 119 at line 209.

At line 213, the contact server 103 establishes the outbound portion of the communication session with the recipient device 109. In one embodiment, the contact server 103 communicates with the recipient device 109 via a cellular network 111b (FIG. 1), a data network 112b, a PSTN 113b, and/or another type of network. Assuming the user on the recipient device 109 accepts the request, the recipient device 109 connects to the bridge 119, as shown at line 216. For instance, the contact server 103 may determine that the recipient device 109 accepted the request by way of a ring back, a custom ring back tone, an acceptance greeting, and/or any other type of acceptance notification.

At line 223, the communication session is established between the caller device 106 and the recipient device 109 via the bridge 119. The bridge service 116 may then monitor the connectivity of both devices 106 and 109 with the bridge 119. In one embodiment, the bridge service 116 determines whether either one of the caller devices 106 or the recipient device 109 loses connection with the bridge 119. For instance, the recipient device 109 may unexpectedly lose its connection to the bridge 119. As another example, the handoff service 115 executed by the contact server 103 and/or the handoff application 130b executed by the recipient device may cause the recipient device 109 to perform a handoff from one network to another, which may temporarily cause the recipient device 109 to lose its connection to the bridge 119. In response, the bridge service 116 may cause the contact server 103 to reestablish connection with the recipient device 109, as shown at line 225. The bridge service 116 may then determine that the bridge 119 is still active (based on a match of the unique identifier, etc.) and the contact server 103 may instruct the recipient device 100 to re-connect to the bridge 119 or otherwise re-connects the recipient device 109 to the bridge 119, as shown by line 227.

Figure 3:
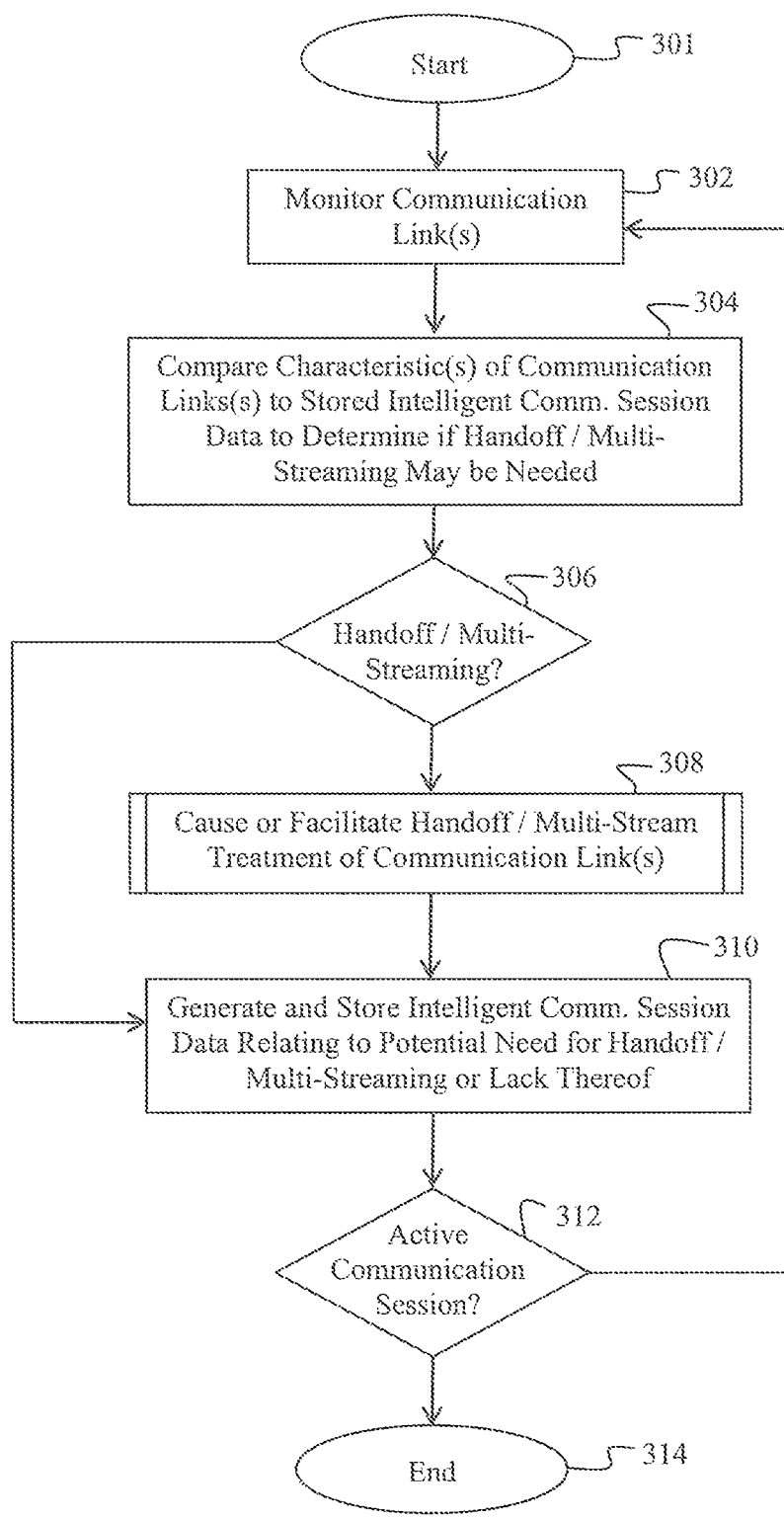
FIG. 3 is a flowchart illustrating an exemplary method for performing intelligent handoffs and/or multi-streaming in order to enhance communication sessions and/or avoid dropped or interrupted communication sessions according to certain exemplary embodiments of the present invention.

Referring next to FIG. 3, shown is a flowchart that illustrates an exemplary method for performing intelligent handoffs and/or multi-streaming in order to enhance communication sessions and/or avoid dropped or interrupted communication sessions. This or similar methods may be executed by the handoff service 115 and/or the multi-stream service 117 regardless of whether the handoff service 115 or the multi-stream service 117 are executed on the contact server 103, in the cloud, or on one or more of the communication devices 106, 109. The method of FIG. 3 may also, or alternatively, be performed by a handoff application 129 and/or multi-stream application 130 executed by a communication device 106, 109, according to certain embodiments. It is to be understood that the flowchart of FIG. 3 provides merely an example of the many different types of functional arrangements that may be employed to implement operations of a handoff application 129 and/or handoff service 115 and/or a multi-stream application 130 and/or multi-stream service 117 as described herein. As an alternative, the flowchart of FIG. 3 may be viewed as depicting an example of steps of a method implemented in the networked environment 100 (FIG. 1) according to one or more embodiments.

The exemplary method begins at start step 301 and proceeds from there to step 302, where one or more communication links is monitored. As described, various characteristics of a communication link may be monitored, including connection strength, access points used, location of communication devices, media stream quality, and any other previously described intelligent communication session data. Then in step 304 the characteristic(s) of the communication link(s) are compared to previously stored intelligent communication session data 133 to predictively determine if a handoff or multi-streaming may be needed to enhance a communication session and/or avoid a dropped or interrupted communication session. If it is determined at step 306 that a handoff or multi-streaming should be performed, the method advances to step 308, where the handoff or multi-streaming is caused or facilitated. After the handoff or multi-streaming is performed in step 308, or if is determined in step 306 that no handoff or multi-streaming is needed, the method moves to step 310, where additional intelligent communication session data 133 is generated and stored relating to whether or not a handoff or multi-streaming was determined to be needed. Such data may include, for example, the characteristic(s) of the applicable communications link(s) at the time such determination was made, etc.

At step 312, a determination is made as to whether the communication session remains active. If so, the method returns to step 302, where one or more of the communications links are again monitored, and the method is repeated from that point as previously described. When it is determined at step 312 that the communication session is no longer active, the method ends at step 314.

Figure 4:
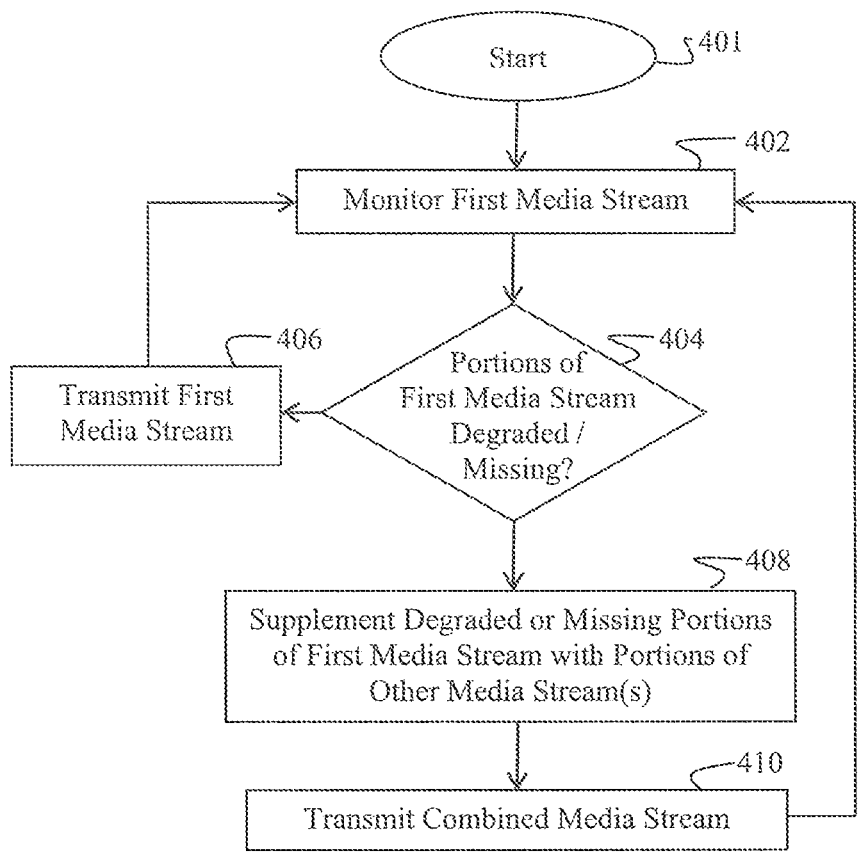
FIG. 4 is flowchart illustrating an example of how multiple media streams may be processed in order to form a single media stream for a communication session according to certain exemplary embodiments of the present invention.

Referring next to FIG. 4, shown is a flowchart that provides one example of how multiple media streams may be processed in order to form a single media stream for a communication session. This or similar methods may be performed by a multi-stream service 117 regardless of whether the multi-stream service 117 is executed on the contact server 103, in the cloud, or on one or more of the communication devices 106, 109. In addition, or in the alternative, the method of FIG. 4 may be performed by a multi-stream application 130 executed by one or more of the communication devices 106, 109, according to certain embodiments. It is to be understood that the flowchart of FIG. 4 provides merely an example of the many different types of functional arrangements that may be employed to implement operations of a multi-stream service 117 and/or a multi-stream application 130 as described herein. As an alternative, the flowchart of FIG. 4 may be viewed as depicting an example of steps of a method implemented in the networked environment 100 (FIG. 1) according to one or more embodiments.

The exemplary method begins at start step 401 and proceeds to step 402, where a first incoming media stream is monitored to determine if any significant portions of it are degraded or missing. If it is determined at step 404 that no significant portions of the first media stream are degraded or missing, the first media stream is transmitted or continues to be transmitted to the intended communication device at step 406. Following step 406, the method returns to step 402 to continue monitoring the first media stream. However, if it is determined at step 404 that significant portions of the first media stream are degraded or missing, the method advances to step 408, where such portions of the first media stream are supplemented with corresponding portions of one or more other incoming media streams. By way of example, degraded or missing packets from the first media stream can be replaced by corresponding packets taken or reproduced from the one or more other media streams. Other techniques for combining or aggregating multiple media streams will occur to those of skill in the art and are deemed to be encompassed by this disclosure. After supplementing the first media stream with portions of one or more other incoming media streams at step 408, the combined media stream is transmitted to the intended communication device at step 410. From step 410, the method returns to step 402 where the first media stream continues to be monitored and is repeated from that point as described above for as long as multiple media streams are received.

The flowcharts of FIGS. 2-4 show the functionality and operation of various services and applications described herein. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts of FIGS. 2-4 each show a specific order of execution, it is understood that the order of execution may differ from that which is depicted. Also, steps shown in succession in the flowcharts may be executed concurrently or with partial concurrence. Further, in some embodiments, one or more of the steps shown in the flowcharts may be skipped or omitted. In addition, any number of counters, state variables, warning semaphores, or messages might be added to the logical flows described herein, for purposes of enhanced utility, accounting, performance measurement, or providing troubleshooting aids, etc. It is understood that all such variations are within the scope of the present disclosure.

Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages. Software components are stored in a memory and are executable by a processor. In this respect, the term "executable" means a program file that is in a form that can ultimately be run by a processor. Examples of executable programs may be, for example, a compiled program that can be translated into machine code in a format that can be loaded into a random access portion of a memory and run by a processor, source code that may be expressed in proper format such as object code that is capable of being loaded into a random access portion of a memory and executed by a processor, or source code that may be interpreted by another executable program to generate instructions in a random access portion of a memory to be executed by a processor, etc. An executable program may be stored in any portion or component of a memory including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

A memory is defined herein as including both volatile and nonvolatile memory and data storage components. Volatile components are those that do not retain data values upon loss of power. Nonvolatile components are those that retain data upon a loss of power. Thus, a memory may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

The devices described herein may include multiple processors and multiple memories that operate in parallel processing circuits, respectively. In such a case, a local interface, such as a communication bus, may facilitate communication between any two of the multiple processors, between any processor and any of the memories, or between any two of the memories, etc. A local interface may comprise additional systems designed to coordinate this communication, including, for example, performing load balancing. A processor may be of electrical or of some other available construction.

Although the handoff service 115, bridge service 116, multi-stream service 117, handoff application 129, multi-stream application 130 and other various systems and components described herein may be embodied in software or code executed by general purpose hardware, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Also, any logic, functionality or application described herein, including the handoff service 115, bridge service 116, multi-stream service 117, handoff application 129, multi-stream application 130, that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A method comprising:

hosting a communication session between a first communication device and a second communication device in an Internet Protocol (IP) based packet data network in which a contact server functions as a bridge service between the first communication device and the second communication device wherein the contact server has established separate communication links with the first communication device and the second communication device, and wherein (i) the communication link between the first communication device and the contact server is a voice-over IP (VoIP) communication link over a wireless data network comprised of a first packet data media stream, and (ii) the contact server is capable of receiving multiple concurrent packet data media streams from the first communication device;

receiving in the contact server the first packet data media stream and at least one other packet data media stream from the first communication device;

predictively determining when to combine the first packet data media stream and the at least one other packet data media stream into a single packet data media stream wherein predictively determining comprises at least one of: (i) determining that the first communication device is approaching a location where the VoIP communication link is prone to interruption; (ii) determining that the first communication device is approaching a location where the VoIP communication link is prone to degradation; and (iii) determining that the first communication device is approaching a location where the VoIP communication link is connected to an access point that is prone to service interruptions or poor communication quality;

combining the first packet data media stream and the at least one other packet data media stream into a single packet data media stream; and transmitting the combined single packet data media stream to the second communication device.

2. The method of claim 1, wherein the combining step is performed when the first packet data media stream suffers a loss of data packets.

3. The method of claim 1, wherein the combining step is performed when the first packet data media stream suffers a degradation of data packets.

4. The method of claim 1, wherein receiving in the contact server the first packet data media stream and at least one other packet data media stream from the first communication device comprises receiving the packet data media streams over a first network and a second network.

5. The method of claim 1, wherein receiving in the contact server the first packet data media stream and at least one other packet data media stream from the first communication device comprises receiving the packet data media streams over a single communication link.

6. The method of claim 1, wherein receiving in the contact server the first packet data media stream and at least one other packet data media stream from the first communication device comprises receiving the packet data media streams over a multiple communication links.

7. The method of claim 1, wherein combining the first packet data media stream and the at least one other packet data media stream into a single media stream comprises at least one of: aggregating, switching, or mixing the packet data media streams into the single packet data media stream.

8. The method of claim 1, wherein combining the first packet data media stream and the at least one other packet data media stream into a single media stream comprises:

monitoring a first packet data media stream to identify missing or degraded portions there of;

identifying corresponding portions of at least one other packet data media stream; and replacing the missing or degraded portions of the first packet data media stream with the corresponding portions of the at least one other packet data media stream.

9. A system for enhancing or avoiding a dropped or interrupted communication session, comprising:

a memory; and a contact server in an Internet Protocol (IP) based packet data network including a processor for executing code to:

host a communication session between a first communication device and a second communication device in which the contact server functions as a bridge service between the first communication device and the second communication device wherein the contact server has established separate communication links with the first communication device and the second communication device, and wherein (i) the communication link between the first communication device and the contact server is a voice-over IP (VoIP) communication link over a wireless data network comprised of a first packet data media stream, and (ii) the contact server is capable of receiving multiple concurrent packet data media streams from the first communication device;

receive in the contact server the first packet data media stream and at least one other packet data media stream from the first communication device;

predictively determine when to combine the first packet data media stream and the at least one other packet data media stream into a single packet data media stream wherein predictively determining comprises at least one of: (i) determining that the first communication device is approaching a location where the VoIP communication link is prone to interruption; (ii) determining that the first communication device is approaching a location where the VoIP communication link is prone to degradation; and (iii) determining that the first communication device is approaching a location where the VoIP communication link is connected to an access point that is prone to service interruptions or poor communication quality;

combine the first packet data media stream and the at least one other packet data media stream into a single packet data media stream; and transmit the combined single packet data media stream to the second communication device.

10. The system of claim 9, wherein combining the first packet data media stream and the at least one other packet data media stream into a single packet data media stream is performed when the first packet data media stream suffers a loss of data packets.

11. The system of claim 9, wherein combining the first packet data media stream and the at least one other packet data media stream into a single packet data media stream is performed when the first packet data media stream suffers a degradation of data packets.

12. The system of claim 9, wherein receiving in the contact server the first packet data media stream and at least one other packet data media stream from the first communication device comprises receiving the packet data media streams over a first network and a second network.

13. The method of claim 9, wherein receiving in the contact server the first packet data media stream and at least one other packet data media stream from the first communication device comprises receiving the packet data media streams over a single communication link.

14. The method of claim 9, wherein receiving in the contact server the first packet data media stream and at least one other packet data media stream from the first communication device comprises receiving the packet data media streams over a multiple communication links.

15. The system of claim 9, wherein combining the first packet data media stream and the at least one other packet data media stream into a single media stream comprises at least one of: aggregating, switching, or mixing the packet data media streams into the single packet data media stream.

16. The system of claim 9, the contact server processor further operative to execute code to:
- monitor a first packet data media stream to identify missing or degraded portions there of;
- identify corresponding portions of at least one other packet data media stream; and
- replace the missing or degraded portions of the first packet data media stream with the corresponding portions of the at least one other packet data media stream.

\* \* \* \* \*